March 7, 1961 E. R. BURDEN Re. 24,946

SELF-LOCKING FOLDING BOX

Original Filed Dec. 31, 1956 2 Sheets-Sheet 1

INVENTOR
Edward R. Burden

BY Cecil L. Wood

ATTORNEY

March 7, 1961 E. R. BURDEN Re. 24,946

SELF-LOCKING FOLDING BOX

Original Filed Dec. 31, 1956 2 Sheets-Sheet 2

INVENTOR

Edward R. Burden

BY Cecil L. Wood

ATTORNEY

United States Patent Office

Re. 24,946
Reissued Mar. 7, 1961

24,946

SELF-LOCKING FOLDING BOX

Edward R. Burden, 1213 Hord St., Dallas, Tex.

Original No. 2,846,133, dated Aug. 5, 1958, Ser. No. 631,922, Dec. 31, 1956. Application for reissue July 8, 1959, Ser. No. 825,857

7 Claims. (Cl. 229—34)

Matter enclosed in heavy brackets [ ] appears in the original patent but forms no part of this reissue specification; matter printed in italics indicates the additions made by reissue.

This invention concerns folded boxes, more particularly "self-locking" folded boxes.

Folded boxes are generally made of heavy paper cut-outs, plastic sheets, and metal or foil covered paper. The cut-outs are folded where indicated, usually to form double walls for the ends and sides with tabs and extensions arranged for engagement between them at the vertical corners of the double walls. In some instances, an extension is provided on the fold-down end pieces which form a flange at the bottom horizontal corner of each end.

The principal object of the present invention is to provide improved means for joining the side walls to the end walls, particularly to secure the engaging tab against the likelihood of disengagement in ordinary handling. The arrangements now used depend on the spring effect of the paper at the tab-fold to maintain the tab engagement, but experience has proven this to be inadequate and hence unsatisfactory.

Another object is to provide extensions on the fold-down pieces of the sides to form flanges at the bottom horizontal corners of the sides, as well as on the fold-down pieces of the ends, with the end flange-extensions overlapping those on the sides. Thus, when the end flange-extensions are locked down by the tabs in engagement with the side walls, the side wall flanges are held down upon the bottom of the box.

Still another object is to provide an improved method of indicating the fold lines between the fold-down side pieces and the flange-forming extensions, which insures sharper corners, and also contributes toward making the flanges lie flat on the bottom which makes the sides more rigid. In the present invention, the fold lines for the flanges are lines of longitudinally thin perforations, definitely fixing the point of folding and removing substantially one-half of the material which, of course, makes folding much easier. *The remaining folds are indicated by indentations in the cardboard or material being folded, the indentation extending the entire length of each fold line, and assuring that, as two sections on opposite sides of a fold line are nonchalantly revolved about such an indentation, the fold will occur along the indentation, and only at that line. The arrangement of all folds is thus automatically taken care of by the present invention.*

The trade has responded very favorably to this new box especially because of ease of setting it up, the snap-action stay put characteristics of the tabs for "locking" the ends to the sides. This makes the box more stable and thus more convenient to handle.

The top or cover of the box is similar in all respects to the container part and setting it up is obviously the same.

Other objects will appear from the description given below when considered in connection with the drawing accompanying this application, which drawing shows the preferred form constructed in accordance with the invention.

Figure 1:
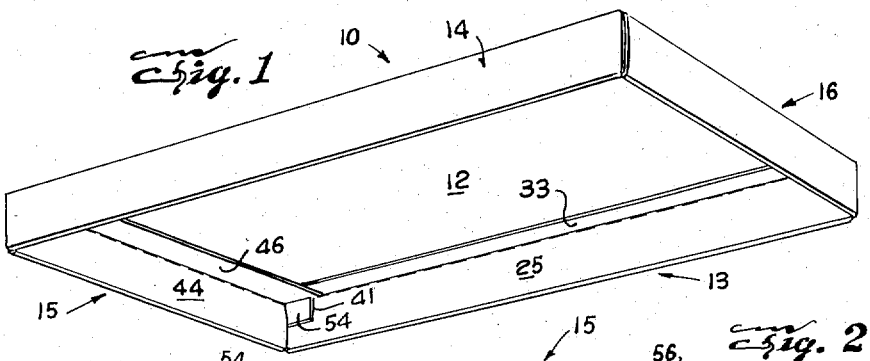
Fig. 1 is a perspective view of the box cover (the container part of the box being similar), showing principally the inside.

Continuing now with a detailed description of the present invention, reference numeral 10, Fig. 1, designates generally either the cover or the container part of the box, since they are in all respects identical except for size, the cover of course being made slightly larger. Numeral 11, Fig. 2, refers in general to the cut-out for making up either the cover or container part of the box, by folding, as indicated, along the pressed lines, and the perforated lines provided on the said cut-out. To avoid confusion and repetition, only the container part of the box will be dealt with from now on and it will be referred to simply as the "box."

The box consists of the bottom 12, the double-wall sides 13, 14, and the double wall ends 15, 16. The pieces 17, 18 which make the outside walls of said double-wall sides, are bent upwardly along the pressed lines 19, 20, respectively; and the wall-returns 21, 22, and 23, 24, arranged thereon are bent inwardly toward each other. Next the pieces 25, 26, which make the inside walls of said double-wall sides, are bent downwardly toward the said box bottom along the lines 27, 28, respectively; and their wall-returns 29, 30, and 31, 32, are bent inwardly toward each other. Then the extension pieces 33, 34, are bent outwardly on lines 35, 36, respectively. Finally, the said sidewalls 25, 26, are pressed inwardly and downwardly against said side walls 17, 18, with the extension pieces 33, 34, coming to rest on said box bottom and forming stiffening flanges with said side-walls 25, 26. This is the stage of the setting up shown for one box end in Fig. 3. Also, shown in Fig. 3 is the recess, 41, formed by the notch 37, of the cut-out of Fig. 2. Each of the other corners is provided with an exactly similar recess formed by corresponding notches 38, 39, 40, Fig. 2. The details of one box end and its setting up will now be described, both ends being alike.

Figure 2:
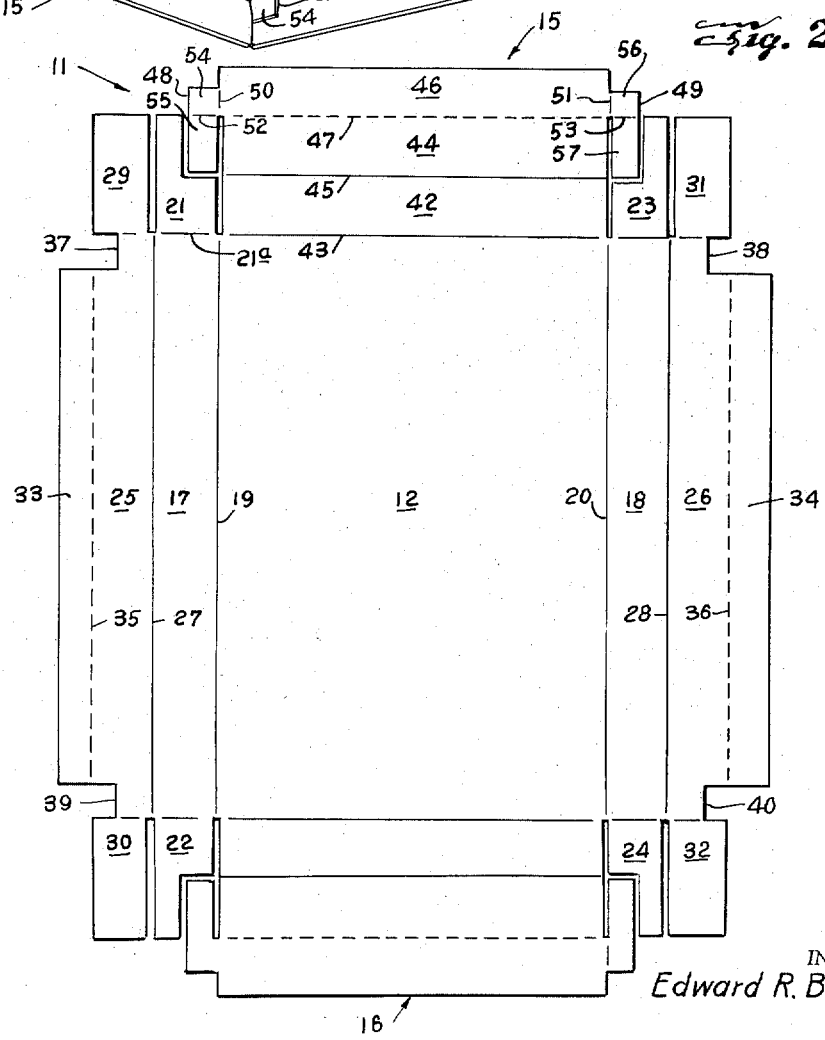
Fig. 2 is a plan view of the cut-out for either the cover or the container part of the box, showing *scoring lines and* perforation lines for folding the extension pieces to form the *sides, tabs and* flanges.
Figure 3:
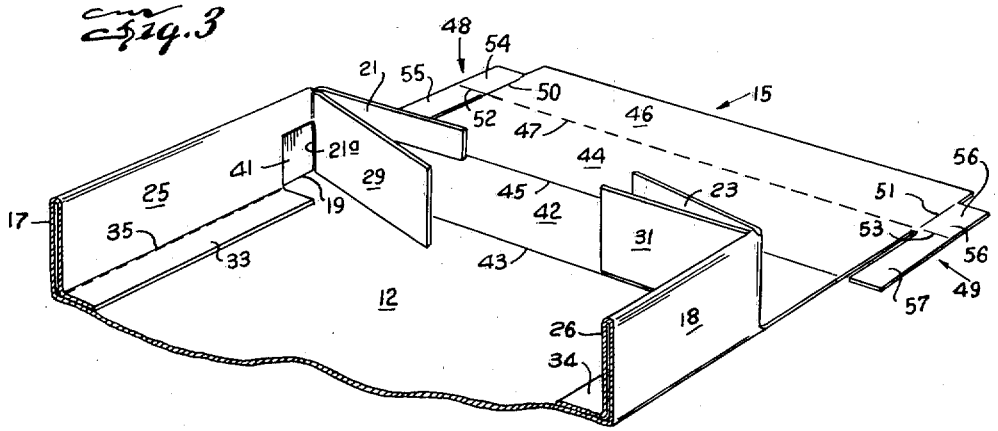
Fig. 3 is a perspective view of one end portion of the cut-out showing the side-folding completed; and the side wall returns over which the inside end-wall folds.
Figure 4:
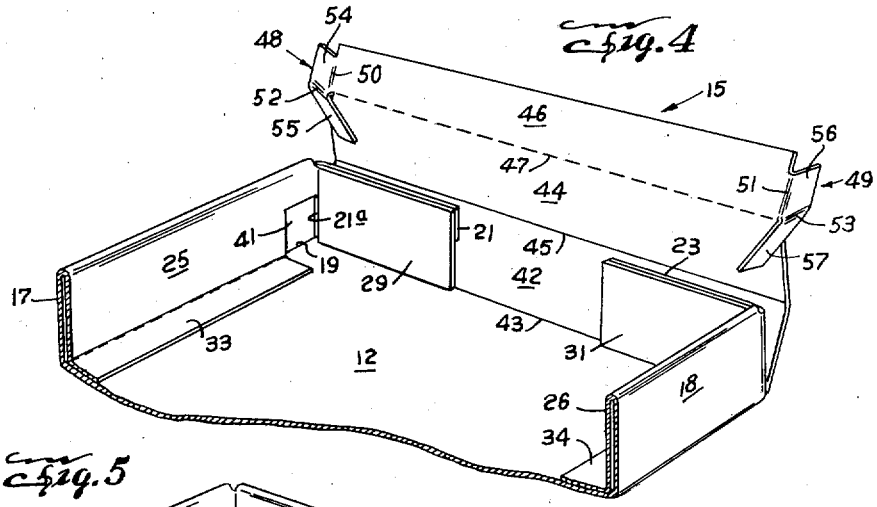
Fig. 4 is a perspective view showing the sides folded, the side-returns in position, and the end creased, ready for bending the inside end-wall over the side-returns and pressing it downwardly into the box.
Figure 5:
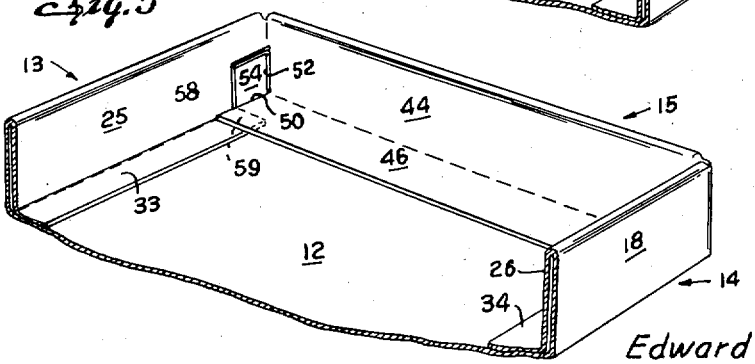
Fig. 5 shows the end completed, with the tabs "locked in" and the end flange lapping over the side flanges.

Referring to Figs. 3, 4, 5, the piece 42, which makes the outside wall of said double-wall end 15, Fig. 2, is bent upwardly on line 43, and the piece 44, which makes the inside wall, is bent inwardly on the line 45. The extension piece 46, is bent outwardly on the line 47, which makes a stiffening flange on said inside wall 44. This extension piece or flange 46, carries two tabs 48, 49, one attached to each end. These tabs are folded backward toward each other on the lines 50, 51, respectively. They also are folded on lines 52, 53, dividing each tab into two parts 54, 55, and 56, 57, respectively. We have now reached the stage of setting up shown in Fig. 4.

The flange 46, is further bent to substantially a right angle with the inside wall 44, and the tab parts 54, 56, are further bent to substantially a right angle with said flange. The tab parts 55, 57, are then bent against said inside wall 44. Finally, the said inside wall is bent downwardly over the side returns 21, 29, and 23, 31, with the tab parts 55, 57, falling between said inside wall and said side-returns. As said inside wall is pressed against said outside wall and said flange *46* is pressed against the bottom, the tab parts 54, 56, snap into their corresponding recesses to "lock-up" the box, as in Fig 5, where the tab-part 54, engages recess 41, of Fig. 4. *The natural resiliency of the cardboard causes the tabs to remain biased toward their positions within the recesses, as, for instance, the tab part 54 is biased toward a position within the recess 41. In such position, the edge of the tab part 54, particularly at the lower end thereof, abuts the edge of the recess 41, particularly at its lower end. The concentration of contact occurs especially at the lower ends of the tab and recess respectively, because the natural resilience of the cardboard tends to return the flaps 44 and 46 toward their original flat conditions. In this connection, it will be observed that the upper end of the corner edge 52 of the tab 54 will move only a short distance before abutting the end wall so that the edge 52 thus performs an important restraining function in the present novel locking arrangement.*

*The arrangement and relationship of the flanges 33 and 46, together with the tab part 54, play an important function in the novel locking device, as will now be explained. It has already been made clear that the top of the tab part (as viewed in Figure 5) is always biased against the side section 17 due to the natural resilience of the cardboard and tendency of the folded parts to return to their flat, unfolded condition. This invention features a reliance upon that natural tendency of the cardboard combined with restraints applied at critical locales on the tab parts and flanges. These restraints can be seen from Figure 5 to be caused by the position of the flange 46 overlying the flange 33 while at the same time extending beyond the recess 14 and the tab part 54. This extension of the flange 46 is designated as a shoulder 58, and there is a similar shoulder adjacent the remaining three recesses.*

*The shoulder 58 holds the inner side wall 25 and its flange 33 outward. The corner 59 of the flange 46 (defined on one side by the shoulder 58) overlies the flange 33 and holds that flange flat against the bottom 12 (though the natural tendency of the flange 33 is to lie against the bottom 12). The flange 33, in turn, being between the flange 46 and the bottom 12, prevents the flange 46 from slipping beneath the inner wide wall 25. The bearing surface before mentioned, namely, the edge of the tab part 54 against the edge of the recess 41 is thus maintained. It follows that there will always be contact between the edge of the tab part 54 and the edge of the recess 41 to resist the inward movement of the end walls away from their completely folded condition, as illustrated in Figure 5.* Simultaneously, said flange *46* braces the inside walls of said sides, as at 58, Fig. 5, and overlaps upon the side wall flanges, as at 59, Fig. 5, enabling said side wall flanges to hold said inside walls in alignment and make the box more rigid as well. The snap action of the recess engaging tab-parts, for example 54, is obtained by the inclusion of tab-part 55, bent substantially at right angle on the fold line 52. This part, in each instance, rests on the bottom edgewise, and supports part 54, along the fold line 52, substantially vertical from its fold-line 50. This completes the detailed description of the invention.

*In addition to the above described manner of folding the present box, it should be observed that the locking feature will function without the tab sections 55 and 57. For example, the box is easily folded by grasping the flat sheet with the hands bracing the two sides. The sides may then be bodily flexed about the indented lines 19 and 20, with particular pressure being applied by one's fingers to the inner sections 17 and 18, until the sides are bent at right angles to the bottom. The indentations 19 and 20 will assure the proper location of this initial fold.*

*Next, while the fingers hold the sides in this folded condition, the outer side panels 25 and 26 can be further bent with respect to the inner sections 17 and 18 by application of pressure by one's thumbs. As these outer panels 25 and 26 are bent to approach 180° where they become flat against the sections 17 and 18, their flanges 33 and 34 will brush against the bottom 12 of the box. Further bending of the panels 25 and 26 by the thumbs (as the fingers hold the sections 17 and 18 at right angles to the bottom 12) will cause the flanges 33 and 34 to bend about their perforated lines 35 and 36 until they are flush with the bottom 12 as the panels 25 and 26 become flush with the sections 17 and 18.*

*The ends are folded one at a time. While the thumb and last fingers hold the sides perpendicular to the bottom, the flaps 21 and 29, which are now flush together, can be bent with the index finger of the left hand as, at the same time, the flaps 23 and 31 are bent with the index finger of the right hand.*

*By holding the bent flaps down against the bottom 12 with the thumbs, the sides will be held perpendicular thereto. The adjacent end can then be bent by the index fingers about the indented line 43. As the outer end section 44 is bent about its indented line 45, and about the flaps 21, 29 and 23, 31, it will hold those flaps against the bottom. The hands are thus freed to bend the tabs 48 and 49 upwardly before the end is completely folded. Thereafter, as the outer section 44 is pressed toward the inner section 42, the flange 46 will automatically bend about its perforated line 47 in the manner explained respecting the flanges 33 and 34. In addition, the tab parts 54 and 56 will approach their respective recesses (recess 41 for the tab part 54) until these tabs snap into place. The end will then be securely held into place by the tab and recess arrangement and the side panels will be held in place by the end flange 46.*

*Obviously, the folding of the opposite end 16 is similar to that of the end just described, after which the box will be ready for use.*

Precisely, the invention comprises a box consisting of a cover and an open top container made substantially alike with the cover fitting down over the container, each having opposite folded double-wall sides and ends, the inside walls thereof being provided with flanges along their longitudinal edges, said inside end-wall flanges lapping over the ends of said inside side-wall flanges; rectangular notches in said inside walls forming recesses at each of the cover and container corners; tabs arranged at each end of said end-wall flanges, said tabs each made in one piece, bent transversely near the center substantially at right angle to form two parts, a first part being joined to the end of said end flanges and bent upwardly to engage said recesses, a second part arranged to engage the bottom between the walls of the double-wall box ends.

The construction shown and described above is, of course, capable of modification, and such modification as may be construed to fall within the spirit and intent of the invention revealed herein, is also considered to fall within the scope and meaning of the appended claims.

What is claimed is:

*1.* A folding box having a bottom and folded double wall sides and ends, each wall of the double wall sides having returns at both ends engaging the ends between their returns at both ends engaging the ends between their double walls, flanges provided along the longitudinal edges of the inside walls of the double wall sides arranged to rest on the bottom, flanges provided along the longitudinal edges of the inside walls of the double wall ends arranged to lie on the bottom, the end wall flanges overlapping the ends of the side wall flanges and bearing against the inside walls of the double wall sides, the side wall flanges being shorter than the walls of the double wall sides, rectangular notches in each end of the inside walls of the double wall sides forming recesses therein at each corner meeting of the sides and ends, beyond the ends of the side wall flanges, tabs provided on each end of the end wall flanges arranged to engage the recesses to lock the double wall ends to the double wall sides, the tabs each having an extension arranged to engage the bottom between the inside and outside walls of the adjacent double wall end, the tabs and the extensions thereof being made in one piece each folded transversely near the center substantially at right angles to form two parts, a first part joined to one end of the adjacent end flange and bent upwardly for engagement with the adjacent recess, and a second part arranged to lie between the double walls of the adjacent double wall end and there rest upon the bottom.

*2. A box having a bottom, two sides attached to the bottom and two ends attached to the bottom; each side comprising an outer wall and an inner wall attached to the top of the outer wall; each side inner wall having a flange attached to the bottom of it, flush with the bottom; each end having an outer wall and an inner wall attached to the top of the outer wall; each end inner wall having a flange attached to the bottom of it, the ends of which overlie the ends of the side wall flanges; each side inner wall having a hole through its two lower corners and each end flange having a pair of tabs attached to it, one sprung into each hole; each side edge of each end flange extending somewhat inwardly beyond the adjacent tab and hole and abutting a portion of the lower edge of the adjacent side inner wall, whereby the end flanges wedge the side inner walls outwardly, the arrangement being such that the end wall flanges lock the side inner walls against the side outer walls, and the side inner walls through the interlocking of the tabs and recesses, lock the end inner walls against the end outer walls; at least one wall of each side having flaps at its ends extending between the adjacent outer and inner end walls so that the ends and sides are maintained by the flaps in substantial perpendicular relation to the bottom.*

*3. A box of the type described having a bottom, a pair of double layer side walls attached to one another at their upper edges and a pair of double layer end walls attached to one another at their upper edges; first means attached to the side walls and engageable between the layers of the end walls for holding the side walls and end walls substantially perpendicular to the bottom; flange means attached to each inner side wall layer and flange means attached to each inner end wall layer; the side wall flange means being held down and outward by the end wall flange means; means integral with the end wall flange means and engageable by the inner side wall layers for holding the end wall flange means outward; said engagement by the inner side wall layers being locked by the side wall flange means, whereby the end wall flange means lock the inner side wall layers against the outer side wall layers; and the inner side wall layers, together with the flanges and the engagement of the integral means by the inner side wall layers, lock the inner end wall layers against the outer end wall layers.*

*4. The box of claim 3 wherein said means for holding the end wall flange means outwardly comprises recesses in each lower corner of each inner side wall layer and a tab sprung into each recess, two of said tabs being connected to each end wall flange means.*

*5. The box of claim 4 wherein said engagement by the inner said wall layers being locked by the side wall flange means is effected by virtue of the end wall flange means overlying the side wall flange means and extending beyond said recesses.*

*6. The box claim 5 wherein the folding of the flanges takes place about perforated lines and the remaining folds take place about scoring lines.*

*7. A box of the type described having a bottom, a pair of double layer side walls attached to one another at their upper edges and a pair of double layer end walls attached to one another at their upper edges; first means attached to the side walls and engageable between the layers of the end walls for holding the side walls and end walls substantially perpendicular to the bottom; flange means attached to each inner side wall layer and flange means attached to each inner end wall layer; the side wall flange means being held down and outward by the end wall flange means; recesses in the lower corners of the inner side wall layers; tab means integral with the end wall flange means and engageable by the recesses in the inner side wall layers for holding the end wall flange means outward; said engagement by the inner side wall layers being locked by the side wall flange means, whereby the end wall flange means lock the inner side wall layers against the outer side wall layers; and the inner side wall layers, together with the flanges and the engagement of the integral means by the inner side wall layers, lock the inner and end wall layers against the outer end wall layers.*

References Cited in the file of this patent or the original patent

UNITED STATES PATENTS

| | | |
|---|---|---|
| 564,593 | Craw | July 28, 1896 |
| 1,912,952 | Scruby | June 6, 1933 |
| 2,143,308 | Flach | Jan. 10, 1939 |
| 2,177,999 | Schwantes | Oct. 31, 1939 |
| 2,193,924 | Huye | Mar. 19, 1940 |
| 2,334,425 | Lowey | Nov. 16, 1943 |
| 2,577,007 | Dubilier | Dec. 4, 1951 |
| 2,752,037 | Vogt | June 26, 1956 |